United States Patent
Dontsova et al.

(10) Patent No.: US 11,421,521 B1
(45) Date of Patent: Aug. 23, 2022

(54) METHOD OF OPTIMIZING RATE OF PENETRATION

(71) Applicant: ENOVATE CORP., Spring, TX (US)

(72) Inventors: Evgeniya Dontsova, Houston, TX (US); Miguel Camilo Mejia, Houston, TX (US); Jerry Webb, Houston, TX (US); Oscar Mauricio Molina Ortiz, Houston, TX (US)

(73) Assignee: ENOVATE CORP., Spring, TX (US)

( * ) Notice: Subject to any disclaimer, the term of this patent is extended or adjusted under 35 U.S.C. 154(b) by 0 days.

(21) Appl. No.: 16/912,042

(22) Filed: Jun. 25, 2020

Related U.S. Application Data

(63) Continuation-in-part of application No. 16/789,150, filed on Feb. 12, 2020.

(51) Int. Cl.
| | |
|---|---|
| *E21B 44/02* | (2006.01) |
| *E21B 44/00* | (2006.01) |
| *G06N 3/04* | (2006.01) |
| *G06N 3/08* | (2006.01) |
| *E21B 47/04* | (2012.01) |
| *E21B 47/06* | (2012.01) |
| *E21B 47/024* | (2006.01) |
| *E21B 49/00* | (2006.01) |
| *E21B 21/08* | (2006.01) |

(52) U.S. Cl.
CPC ............. *E21B 44/02* (2013.01); *G06N 3/04* (2013.01); *G06N 3/08* (2013.01); *E21B 21/08* (2013.01); *E21B 47/024* (2013.01); *E21B 47/04* (2013.01); *E21B 47/06* (2013.01); *E21B 49/00* (2013.01)

(58) Field of Classification Search
CPC ....... E21B 41/0099; E21B 44/02; E21B 45/00
See application file for complete search history.

(56) References Cited

U.S. PATENT DOCUMENTS

| | | | | |
|---|---|---|---|---|
| 6,026,912 A | * | 2/2000 | King | E21B 3/02 |
| | | | | 175/27 |
| 7,100,708 B2 | * | 9/2006 | Koederitz | E21B 44/00 |
| | | | | 175/27 |
| 9,085,958 B2 | * | 7/2015 | Laing | E21B 47/12 |
| 9,988,880 B2 | * | 6/2018 | Dykstra | E21B 44/00 |
| 10,125,597 B2 | * | 11/2018 | McHugh | E21B 7/02 |
| 10,352,099 B2 | * | 7/2019 | Spivey | E21B 7/00 |
| 10,591,625 B2 | * | 3/2020 | Holt | E21B 12/02 |
| 10,995,604 B2 | * | 5/2021 | Hornblower | E21B 7/06 |
| 2019/0234207 A1 | * | 8/2019 | Subramaniyan | G06N 7/005 |
| 2020/0190957 A1 | * | 6/2020 | Madasu | E21B 44/00 |

OTHER PUBLICATIONS

Molina, Oscar M.; Analytical Model to Estimate the Fraction of Frac Hits in Multi-well Pads; Unconventional Resources Technology Conference; URTeC: 238; Jul. 22-24, 2019; pp. 1-24.
Molina, Oscar M.; Application of Pressure and Rate Transient Analyses to Stress-Sensitive Multi-Fractured Composite Systems and Compartmentalized Reservoirs; Louisiana State University; LSU Digital Commons; Jun. 2019; pp. 1-279.
Yadav, Himanshu and Siyavash Motealleh; Improving Quantitative Analysis of Frac-Hits and Refracs in Unconventional Plays Using RTA; Society of Petroleum Engineers; SPE-184812-MS; Jan. 24-26, 2017; pp. 1-14.

* cited by examiner

*Primary Examiner* — Kenneth L Thompson
(74) *Attorney, Agent, or Firm* — Kearney McWilliams & Davis; Dileep P. Rao

(57) ABSTRACT

A recursive method of optimizing rate of penetration while drilling a well. The method can include collecting historical data on a plurality of drilling parameters, performing a mathematical analysis on the historical data to correlate each drilling parameter to a rate of penetration, determining an importance of each drilling parameter, establishing an operating envelope for each drilling parameter, and adjusting at least one drilling parameter to achieve a desired rate of penetration. The steps can then be repeated at a user defined interval.

13 Claims, No Drawings

METHOD OF OPTIMIZING RATE OF PENETRATION

CROSS REFERENCE TO RELATED APPLICATIONS

The present application is a Continuation in Part and claims the priority to and the benefit of co-pending U.S. patent application Ser. No. 16/789,150 filed on Feb. 12, 2020, titled "METHOD OF DETERMINING FRACTURE INTERFERENCE IN A HYDRAULICALLY FRACTURED WELL". This reference is incorporated herein in its entirety.

FIELD

The present disclosure generally relates to optimizing a rate of penetration while drilling a well.

BACKGROUND

Many aspects of drilling a well can be enhanced to improve economic efficiency at each stage. While the present disclosure deals with a specific issue, the disclosed methods can be analogized and/or used in conjunction with other methods during the drilling, completion, evaluation, or production phases of a well in order to achieve optimal financial performance of a well.

To maximize hydrocarbons production, hence increasing economic efficiency from tight rocks, several horizontal wells are drilled in relatively close proximity. Such an arrangement of horizontal wells is often called a multi-well pad. Typically, new wells (i.e. infill, target, or child wells) are landed next to older, depleted wells (i.e. parent, existing, or offset wells).

Currently, in the art, lessons learned from drilling wells are not effectively applied when drilling new wells. Especially in the same or similar geological formation, adjusting parameters can lead to significant gains in efficiency, speed, and cost effectiveness by utilizing information from previously drilled wells. This can be enhanced by combining previous information with real time data from a well being drilled.

It is desirable to optimize rate of penetration (ROP) while drilling a well to allow for the well to be drilled faster and more safely.

The present disclosure provides a method for optimizing the rate of penetration by utilizing data from nearby wells, wells drilled in similar formations, or a combination of drilling information and real time data.

DETAILED DESCRIPTION OF THE EMBODIMENTS

Before explaining the present disclosure in detail, it is to be understood that the disclosure is not limited to the specifics of particular embodiments as described and that it can be practiced, constructed, or carried out in various ways.

While embodiments of the disclosure have been shown and described, modifications thereof can be made by one skilled in the art without departing from the spirit and teachings of the disclosure. The embodiments described herein are exemplary only, and are not intended to be limiting.

Specific structural and functional details disclosed herein are not to be interpreted as limiting, but merely as a basis of the claims and as a representative basis for teaching persons having ordinary skill in the art to variously employ the present embodiments. Many variations and modifications of embodiments disclosed herein are possible and are within the scope of the present disclosure.

Where numerical ranges or limitations are expressly stated, such express ranges or limitations should be understood to include iterative ranges or limitations of like magnitude falling within the expressly stated ranges or limitations.

The use of the word "a" or "an" when used in conjunction with the term "comprising" in the claims and/or the specification may mean "one," but it is also consistent with the meaning of "one or more," "at least one," and "one or more than one."

The word "about", when referring to values, means plus or minus 5% of the stated number.

The use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

When methods are disclosed or discussed, the order of the steps is not intended to be limiting, but merely exemplary unless otherwise stated.

Accordingly, the scope of protection is not limited by the description herein, but is only limited by the claims which follow, encompassing all equivalents of the subject matter of the claims. Each and every claim is hereby incorporated into the specification as an embodiment of the present disclosure. Thus, the claims are a further description and are an addition to the embodiments of the present disclosure.

The inclusion or discussion of a reference is not an admission that it is prior art to the present disclosure, especially any reference that may have a publication date after the priority date of this application. The disclosures of all patents, patent applications, and publications cited herein are hereby incorporated by reference, to the extent they provide background knowledge; or exemplary, procedural or other details supplementary to those set forth herein.

The embodiments of the present disclosure generally relate to optimizing a rate of penetration while drilling a well.

The method of optimizing the rate of penetration (ROP) while drilling a well can include the steps of: collecting historical data on a plurality of drilling parameters, performing a mathematical analysis on the historical data to correlate each drilling parameter of the plurality of drilling parameters to a rate of penetration, determining an importance of each drilling parameter of the plurality of drilling parameters, establishing an operating envelope for each drilling parameter of the plurality of drilling parameters, and adjusting each drilling parameter of the plurality of drilling parameters to achieve a desired rate of penetration, and repeating the above steps at a user defined interval.

A significant number of drilling parameters, often interrelated, are monitored and/or controlled during the process of drilling a well. A non-exhaustive and exemplary list of parameters includes: weight on bit (WOB), pressure, torque, rpm, string weight, mud weight, gas, differential pressure, annulus pressure, flow rates, pump rates, backside pressure, mechanical specific energy, pore pressure, horizontal stress, vibration, tank volumes, returns, inclination angle, azimuth (or direction of the drill bit), gamma, resistivity, density, sonic, azimuthal gamma, annulus pressure, instant inclination, seismic data, directionally defined gamma, depth, lithology, minerology, or secondary parameters calculated using any combination thereof.

While drilling a well, these parameters can be adjusted in a manner that affects the rate of penetration of a geological formation. By collection data on wells that have been drilled previously, the present method provides a novel way of optimizing the rate of penetration for a new well being drilled.

The various parameters as chosen by persons having ordinary skill in the art are logged as a well is being drilled and correlated to a rate of penetration of a geological formation. A non-exhaustive and exemplary list of drilling data utilizable with the present method includes: offset logs, type logs, existing well logs, maps, offset drilling data, offset subsurface data, seismic data, image log data, electric log data, synthetic log data, survey data, or other drilling data.

A mathematical analysis on the data can be performed to determine a relationship between the various parameters and the rate of penetration. Exemplary methods include performing a random forest regression, linear regression, exponential regression, applying a general additive model, and the like.

In embodiments, a filtering methodology can be implemented to eliminate outlier points. For example, a mechanism such as the Mahalanobis distance can be used to account for covariance among the various drilling parameters. Using such a mechanism, the data can be "cleaned" of outliers, and only significant data can be utilized to make the method more accurate.

An importance, or weight can be assigned to each drilling parameter in relation to its effect on the rate of penetration. The mathematical analysis performed can determine the significance an impact of each parameter on the rate of penetration.

Using the assigned importances, an operating envelope utilizing historical data can be determined for each parameter. In embodiments, safety and mechanical operational limits can be incorporated into the operating envelope.

A neural network can be established correlating the operating envelope for each drilling parameter with the rate of penetration. The neural network can be a global neural network for the same or similar geological formation. For example, a single neural network incorporating data from multiple wells can be created for wells drilled in a geographical area, or in geological formations known to have similar characteristics.

The neural network can be modified based upon importances assigned to the drilling parameters. Operating envelopes can therefore be predicted to optimize rate of penetration based upon relationships within the neural network.

In embodiments, real time data gathered while drilling a new well can be combined in conjunction with the historical data to calculate an instantaneous operating envelope for each drilling parameter.

In embodiments, prior to changing a drilling parameter, a proposed operating envelope for each drilling parameter can be tested by inputting the parameter into the neural network to predict the rate of penetration. The neural network can be trained based upon historical drilling data and provide an accurate prediction for a new well being drilled under similar conditions.

The neural network can also incorporate (i.e. be trained with) instantaneous operating envelopes for each drilling parameter to account for individual variances in behavior for the well being drilled. In embodiments, prior to changing a drilling parameter, a proposed instantaneous operating envelope for each drilling parameter can be tested by inputting the parameter into the neural network to predict the rate of penetration.

After testing changes to parameters with a neural network and determining the predicted rate of penetration, at least one drilling parameter can be adjusted to achieve a desired or optimized rate of penetration.

The method can be implemented by computer to automate the process of historical data analysis, weighting of parameter importance, combination with current drilling data, and adjustment of one or more parameters.

While the present disclosure emphasizes the presented embodiments, it should be understood that within the scope of the appended claims, the disclosure might be embodied other than as specifically enabled herein.

What is claimed is:

1. A method of optimizing rate of penetration while drilling a well comprising:
    collecting historical data on a plurality of drilling parameters;
    filtering the historical data to remove outliers and create a significant historical data;
    performing a mathematical analysis on the historical data to correlate each drilling parameter of the plurality of drilling parameters to a rate of penetration;
    determining an importance of each drilling parameter of the plurality of drilling parameters based upon the significant data set;
    establishing an operating envelope for each drilling parameter of the plurality of drilling parameters utilizing the importance of each drilling parameter;
    establishing a neural network utilizing the importance of each drilling parameter correlating the operating envelope for each drilling parameter of the plurality of drilling parameters with the rate of penetration; and
    adjusting at least one drilling parameter of the plurality of drilling parameters to achieve a desired rate of penetration; and
wherein, the above steps are repeated at a user defined interval.

2. The method of claim 1, further comprising using real time data on the plurality of drilling parameters in conjunction with the historical data to calculate an instantaneous operating envelope for each drilling parameter of the plurality of drilling parameters.

3. The method of claim 1, wherein the plurality of drilling parameters includes at least two of: weight on bit (WOB), pressure, torque, rpm, string weight, mud weight, gas, differential pressure, annulus pressure, flow rates, pump rates, backside pressure, mechanical specific energy, pore pressure, horizontal stress, vibration, tank volumes, returns, inclination angle, azimuth (or direction of the drill bit), gamma, resistivity, density, sonic, azimuthal gamma, annulus pressure, instant inclination, seismic data, directionally defined gamma, depth, lithology, minerology, or secondary parameters calculated using any combination thereof.

4. The method of claim 1, wherein the historical data includes at least one of: offset logs, type logs, existing well logs, maps, offset drilling data, offset subsurface data, seismic data, image log data, electric log data, synthetic log data, survey data, or drilling data.

5. The method of claim 1, further comprising testing a proposed operating envelope for each drilling parameter of the plurality of drilling parameters to predict the rate of penetration.

6. The method of claim 2, further comprising establishing a neural network correlating the instantaneous operating envelope for each drilling parameter of the plurality of drilling parameters with the rate of penetration.

7. The method of claim 2, further comprising testing a proposed instantaneous operating envelope for each drilling parameter of the plurality of drilling parameters to predict the rate of penetration.

8. The method of claim 1, further comprising testing a proposed operating envelope with the neural network for each drilling parameter of the plurality of drilling parameters to predict the rate of penetration.

9. The method of claim 6, further comprising: testing a proposed instantaneous operating envelope with the neural network for each drilling parameter of the plurality of drilling parameters to predict the rate of penetration.

10. The method of claim 7, further comprising adjusting at least one drilling parameter.

11. The method of claim 8, further comprising adjusting at least one drilling parameter.

12. The method of claim 9, further comprising adjusting at least one drilling parameter.

13. A computer implemented method of optimizing rate of penetration while drilling a well having a computer comprising a processor and a non-transitory data storage medium, wherein the non-transitory data storage medium comprises instructions instructing the processor to:
   collect historical data on a plurality of drilling parameters;
   filter the historical data to remove outliers and create a significant historical data;
   perform a mathematical analysis on the significant historical data to correlate each drilling parameter of the plurality of drilling parameters to a rate of penetration;
   determine an importance of each drilling parameter of the plurality of drilling parameters;
   establish an operating envelope for each drilling parameter of the plurality of drilling parameters utilizing the importance of each drilling parameter;
   establish a neural network correlating the operating envelope for each drilling parameter of the plurality of drilling parameters with the rate of penetration; and
   adjust at least one drilling parameter of the plurality of drilling parameters to achieve a desired rate of penetration; and
wherein, the above steps are repeated by the processor at a user defined interval.

* * * * *